Patented Nov. 13, 1951

2,575,006

UNITED STATES PATENT OFFICE 2,575,006

MIXTURES COMPRISING POLYACRYLONITRILE AND POLYMERIC ESTER-LACTONES

Harry W. Coover, Jr., Kingsport, Tenn., and Joseph B. Dickey, Rochester, N. Y., assignors to Eastman Kodak Company, Rochester, N. Y., a corporation of New Jersey No Drawing. Application April 29, 1950, Serial No. 159,144

16 Claims. (Cl. 260—30.4)

This invention relates to polymer compositions comprising polyacrylonitrile and polymeric ester-lactones, and to articles prepared therefrom.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and acrylic acid containing about 80 per cent by weight of acrylonitrile and 20 per cent by weight of acrylic acid in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, fibers spun from solutions of mixtures of polyacrylonitrile and polyvinyl acetate, are too low in softening temperature to be of practical value, and also are subject to the defect of segmentation. This is not surprising because it is generally known that polyacrylonitrile is not compatible with many organic (or inorganic) substances.

We have now found new resinous compositions which provide fibers having higher softening points than the interpolymers referred to above, and which do not exhibit the segmentation defect shown by many of the fibers prepared from certain prior art polymer mixtures comprising polyacrylonitrile.

It is, therefore, an object of our invention to provide polymer mixtures comprising polyacrylonitrile and polymeric ester-lactones.

Another object of our invention is to provide methods for making these mixtures.

A further object of our invention is to provide homogeneous solutions of these polymer mixtures. Other objects will become apparent from a consideration of the following description and examples.

According to our invention, we provide polymer mixtures comprising from 60 to 90 per cent by weight of polyacrylonitrile (i. e. a homopolymer of acrylonitrile) and from 40 to 10 per cent by weight of a polymeric ester-lactone of maleic anhydride and an ester selected from the group consisting of vinyl acetate and isopropenyl acetate. Quite unexpectedly, we have found that polymeric compositions having the above range of components are excellently adaptable for the spinning of fibers in that they have a high softening point, and provide fibrous products showing no perceptible segmentation.

The polymeric ester-lactones of maleic anhydride and isopropenyl acetate which we employ in our invention have previously been described in U. S. Patent 2,481,769, dated September 13, 1949. The process described in that patent comprises heating to reacting temperature an equimolar heteropolymer of isopropenyl acetate and maleic anhydride and a saturated monohydric alcohol containing from 1 to 12 carbon atoms, in the presence of an acid-esterification catalyst.

Temperatures used for the esterification (i. e. inner esterification, or lactonization) vary from about 30° C. to the reflux temperature of the reaction mixture, although the temperature can be varied according to the requirements of the operator. If desired, an inert organic solvent, or diluent, e. g. 1,4-dioxane, benzene, carbon tetrachloride, acetone, ethylene dichloride, n-hexane, toluene, etc. can be used. A solvent is especially useful where a high molecular weight alcohol is used in the esterification, e. g. lauryl alcohol (dodecyl alcohol).

The acid-esterification catalysts, used in preparing the polymeric ester-lactones of our invention, have previously been used in the art of esterification of acids, or anhydrides, and alcohols. Typical catalysts include sulfuric acid, phosphoric acid, hydrochloric acid, hydrofluoric acid, methanesulfonic acid, ethanesulfonic acid, n-butanesulfonic acid, benzenesulfonic acid, o-, m-, and p-toluenesulfonic acids, ethanedisulfonic acid, etc.

The alcohols useful in the esterification include the saturated aliphatic, monohydric alcohols containing from 1 to 12 carbon atoms. Those alcohols containing from 5 to 12 carbon atoms are especially useful. Other details of the procedure for esterifying the heteropolymer of isopropenyl acetate and maleic anhydride can be found in U. S. Patent 2,481,769.

The polymeric ester-lactones of maleic anhydride and vinyl acetate which we employ in our invention have previously been described in U. S. Patent 2,306,071, dated December 22, 1942. In general, these ester-lactones can be prepared according to the directions set out above, although the reaction proceeds more readily than that wherein the ester-lactones of isopropenyl acetate and maleic anhydride are prepared. While the ester-lactones prepared from the isopropenyl acetate heteropolymer differ somewhat from those prepared from the vinyl acetate heteropolymer, we have found that both types of ester-lactones are suitable for the purposes of our invention.

The polyacrylonitrile and polymeric ester-lactone resins can be mixed together by any of several methods. The two ingredients can be mixed together in a suitable mixer, such as a ball mill, or they can be dissolved in a mutual solvent (which is known to dissolve polyacrylonitrile), such as N,N-dimethylformamide, N,N-dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry, or dispersion, which is agitated and heated to effect solution. The solubility of the resins in the solvents can be improved by incorporating a small amount of certain acids, such as sulfuric acid, phosphoric acid, oxalic acid, etc. as has been described in the copending applications Serial No. 49,654 and Serial No. 49,655, both filed September 16, 1948, of H. W. Coover, Jr., T. E. Stanin, and Joseph B. Dickey, now Patents Nos. 2,503,244 and 2,503,245, issued April 11, 1950. The concentration of solids in the solvents can be varied, depending on the use to which the composition is to be put; however, for most purposes it has been found that from about 10 to 40 per cent by weight of solids is adequate.

Other solvents which can be used in the preparation of solutions from our new compositions include N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, these solvents are not as advantageous as the solvents referred to above.

The following examples illustrate methods for utilizing the new compositions of our invention.

*Example 1*

20 g. of a mixture containing 20 per cent by weight of the n-amyl ester-lactone of an equimolar heteropolymer of isopropenyl acetate and maleic anhydride (prepared as described in Example VI of U. S. Patent 2,481,769) and 80 per cent by weight of polyacrylonitrile were dissolved in 80 g. of N,N-dimethylformamide, and the solution was filtered under pressure into a stainless steel chamber, which had a single-hole spinneret measuring 0.1 mm. in diameter, extending horizontally from the bottom of the chamber in such a manner that upon extrusion, the filament would emerge at a right angle to the chamber. The chamber was then closed, and the top thereof which was connected to a source of nitrogen gas opened to this gas supply, while a pressure of about 25 pounds per square inch was applied. Upon application of this pressure, the solution was extruded into a shallow bath 6 feet in length, which was placed at a right angle to the chamber, and contained water. The filament coagulated upon coming into contact with the water, and was then taken up on a roller having a peripheral speed of 16 feet per minute. The filament passed from this roller through a hot air chamber heated at 170°–200° C. and onto a wind-up drum one meter in circumference, which was rotating at a surface speed of 59.2 feet per minute. After the drum had made 50 revolutions an automatically controlled guide was shifted one inch to an adjacent position on the drum and the drum was allowed to make another 50 revolutions. This was continued until several such 50-filament bundles were obtained. These were cut from the drum and the bundles containing 50 filaments, each measuring one meter in length, were separately twisted to obtain several one meter lengths of yarn. The samples thus produced had a tenacity of 3.6 grams per denier, an extensibility of 15 per cent at break, and shrank 8 per cent in boiling water.

*Example 2*

In a manner similar to that described in Example 1 above, a N,N-dimethylformamide solution of a mixture containing 20 per cent by weight of an ethyl ester-lactone of an equimolar isopropenyl acetate-maleic anhydride meteropolymer (prepared as described in Example II of U. S. Patent 2,481,769) and 80 per cent by weight of acrylonitrile was spun into fibers one meter in length. They had a tenacity of 3.1 grams per denier, an extensibility of 14 per cent at break, and shrank only 9 per cent in boiling water.

*Example 3*

In a manner similar to that described in Example 1 above, a N,N-dimethylformamide solution of a mixture containing 20 per cent by weight of n-butyl ester-lactone of an equimolar heteropolymer of vinyl acetate and maleic anhydride (prepared as described in Example 4 of U. S. Patent 2,306,071) and 80 per cent by weight of polyacrylonitrile was spun into fibers one meter in length. They had a tenacity of 4.1 grams per denier, an extensibility of 11 per cent at break, and shrank 8 per cent in boiling water.

*Example 4*

In a manner similar to that described in Example 1 above, a N,N-dimethylformamide solution of a mixture containing 10 per cent by weight of the isoamyl ester-lactone of an equimolar heteropolymer of isopropenyl acetate and maleic anhydride (prepared as described in Example VII of U. S. Patent 2,481,769) and 90 per cent by weight of polyacrylonitrile was spun into fibers one meter in length. The fibers had a tenacity of 4.2 grams per denier, an extensibility of 18 per cent at break, and shrank only 7 per cent in boiling water.

Example 5

In a manner similar to that described in Example 1 above, a N,N-dimethylformamide solution of a mixture containing 40 per cent by weight of the isopropyl ester-lactone of an equimolar heteropolymer of isopropenyl acetate and maleic anhydride (prepared as described in Example VIII of U. S. Patent 2,481,769) and 60 per cent by weight of polyacrylonitrile was spun into fibers one meter in length. They had a tenacity of 2.8 grams per denier, an extensibility of 16 per cent at break, and shrank 13 per cent in boiling water.

Example 6

In a manner similar to that described in Example 1 above, a N,N-dimethylformamide solution of a mixture containing 30 per cent by weight of the methyl ester-lactone of an equimolar heteropolymer of isopropenyl acetate and maleic anhydride (prepared as described in U. S. Patent 2,481,769) and 70 per cent by weight of polyacrylonitrile was spun into fibers one meter in length. They had a tenacity of 3.1 grams per denier, an extensibility of 17 per cent at break, and shrank 10 per cent in boiling water.

Example 7

In a manner similar to that described in Example 1 above, a N,N-dimethylformamide solution of a mixture containing 25 per cent by weight of the ethyl ester-lactone of an equimolar heteropolymer of isopropenyl acetate and maleic anhydride (prepared as described in Example II of U. S. Patent 2,481,769) and 75 per cent by weight of polyacrylonitrile was spun into fibers one meter in length. They had a tenacity of 3.4 grams per denier, an extensibility of 14 per cent at break, and shrank only 9 per cent in boiling water.

Solvents other than N,N-dimethylformamide can advantageously be used in the preparation of synthetic fibers and yarns of our invention, including thoses solvents which have been listed above. The fibers can be spun into a drying atmosphere or they can be spun into a precipitating bath containing a liquid in which polyacrylonitrile is insoluble, e. g. water.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the copending applications, Serial No. 49,651, Serial No. 49,652, and Serial No. 49,653, all filed September 16, 1948, of T. E. Stanin, H. M. Coover, Jr., and J. B. Dickey.

The amount of ester-lactone resin used in preparing the polymer compositions of our invention has a marked effect on the physical and chemical properties of the resulting fibers which are prepared from these mixtures. For example, fibers spun from mixtures containing less than about 10 per cent of the ester-lactone resin cannot be satisfactorily dyed, whereas fibers spun from polymeric mixtures containing more than about 40 per cent by weight of the ester-lactone resin do not exhibit the high softening points which characterize the fibers prepared according to the above examples.

The compositions of our invention can also be used in the preparation of sheets, films, tapes, etc.

What we claim as our invention and desire secured by Letters Patent of the United States is:

1. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and an ester selected from the group consisting of vinyl acetate and isopropenyl acetate, with from 2 to 25 molecular proportions of a saturated monohydric aliphatic alcohol containing from 1 to 12 carbon atoms in the presence of an acid-esterification catalyst.

2. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of a saturated monohydric aliphatic alcohol containing from 1 to 12 carbon atoms in the presence of an acid-esterification catalyst.

3. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of a saturated monohydric aliphatic alcohol containing from 5 to 12 carbon atoms in the presence of sulfuric acid.

4. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of ethyl alcohol in the presence of an acid-esterification catalyst.

5. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of isopropyl alcohol in the presence of an acid-esterification catalyst.

6. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of n-amyl alcohol in the presence of an acid-esterification catalyst.

7. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of isoamyl alcohol in the presence of an acid-esterification catalyst.

8. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and an ester selected from the group consisting of vinyl acetate and isopropenyl acetate, with from 2 to 25 molecular proportions of a saturated monohydric aliphatic alcohol containing from 1 to 12 carbon atoms in the presence of an acid-esterification catalyst, in a solvent selected from the group consisting of N,N-dimethylformamide, N,N-dimethylacetamide, N-methyl-2-pyrrolidone, ethylene carbonate, ethylene carbamate, and γ-butyrolactone.

9. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of ethyl alcohol in the presence of an acid-esterification catalyst, in N,N-dimethylformamide.

10. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of isopropyl alcohol in the presence of an acid-esterification catalyst, in N,N-dimethylformamide.

11. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of n-amyl alcohol in the presence of an acid-esterification catalyst, in N,N-dimethylformamide.

12. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and isopropenyl acetate, with from 2 to 25 molecular proportions of isoamyl alcohol in the presence of an acid-esterification catalyst, in N,N-dimethylformamide.

13. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and vinyl acetate, with from 2 to 25 molecular proportions of a saturated monohydric aliphatic alcohol containing from 1 to 12 carbon atoms in the presence of an acid-esterification catalyst.

14. A resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and vinyl acetate, with from 2 to 25 molecular proportions of ethyl alcohol in the presence of an acid-esterification catalyst.

15. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and vinyl acetate, with from 2 to 25 molecular proportions of a saturated monohydric aliphatic alcohol containing from 1 to 12 carbon atoms in the presence of an acid-esterification catalyst, in N,N-dimethylformamide.

16. A solution of a resinous composition comprising from 60 to 90 per cent by weight of polyacrylonitrile and from 40 to 10 per cent by weight of an ester-lactone prepared by heating to reacting temperature one molecular proportion of an equimolar heteropolymer of maleic anhydride and vinyl acetate, with from 2 to 25 molecular proportions of ethyl alcohol in the presence of an acid-esterification catalyst, in N,N-dimethylformamide.

HARRY W. COOVER, Jr.
JOSEPH B. DICKEY.

REFERENCES CITED

The following references are of record in the file of this patent:

UNITED STATES PATENTS

| Number | Name | Date |
|---|---|---|
| 2,404,714 | Latham | July 23, 1946 |
| 2,527,863 | Webb | Oct. 31, 1950 |